(12) United States Patent
Kurimoto (10) Patent No.: US 7,589,859 B2
(45) Date of Patent: Sep. 15, 2009

(54) PRINT APPARATUS, PRINT CONTROL METHOD, STORAGE MEDIUM STORING COMPUTER-READABLE PROGRAM, AND PROGRAM

(75) Inventor: Masami Kurimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 11/075,853

(22) Filed: Mar. 10, 2005

(65) Prior Publication Data
US 2005/0200888 A1    Sep. 15, 2005

(30) Foreign Application Priority Data
Mar. 12, 2004  (JP) .............. 2004-070401

(51) Int. Cl.
G06K 15/00 (2006.01)
G06F 15/00 (2006.01)
H04N 1/40 (2006.01)
G03G 15/00 (2006.01)

(52) U.S. Cl. ............. 358/1.16; 358/1.2; 358/426.04; 358/449; 399/370; 399/386

(58) Field of Classification Search ........... 358/1.2, 358/1.16, 1.18; 395/102; 399/370, 376, 399/386, 389
See application file for complete search history.

(56) References Cited

U.S. PATENT DOCUMENTS

| | | | |
|---|---|---|---|
| 5,771,340 A * | 6/1998 | Nakazato et al. | 358/1.15 |
| 6,137,587 A * | 10/2000 | Muto et al. | 358/1.15 |
| 6,483,604 B1 * | 11/2002 | Gerstenberger | 358/1.17 |
| 6,718,145 B2 * | 4/2004 | Ohta et al. | 399/16 |

FOREIGN PATENT DOCUMENTS

JP    2000-296657    10/2000

* cited by examiner

*Primary Examiner*—Mark K Zimmerman
*Assistant Examiner*—Mesfin Getaneh
(74) *Attorney, Agent, or Firm*—Fitzpatrick, Cella, Harper & Scinto (57) ABSTRACT

A print apparatus comprises a memory for storing compressed print information of at least two or more pages transmitted from a host computer, and executes image formation by extracting the compressed print information read from the memory. When nonconformity between an image size of the page to which the print apparatus is executing the image formation and a paper size fed for the relevant page is detected, the compressed print information, for the page in execution of the image formation, subsequent to the read address on the memory at a point of time of the nonconformity detection is read from the memory, and then extracted and abandoned. Thus, the read address on the memory indicates the head of a page subsequent to the page in execution of the image formation.

8 Claims, 8 Drawing Sheets

STORAGE MEDIUM SUCH AS FD,
CD-ROM OR THE LIKE

| DIRECTORY INFORMATION |
|---|
| 1ST DATA PROC PROGRAM<br>PROGRAM CODE GROUP CORRESPONDING TO<br>STEPS IN FLOW CHART SHOWN IN FIG. 4 |
| 2ND DATA PROC PROGRAM<br>PROGRAM CODE GROUP CORRESPONDING TO<br>STEPS IN FLOW CHART SHOWN IN FIG. 5 |
| 3RD DATA PROC PROGRAM<br>PROGRAM CODE GROUP CORRESPONDING TO<br>STEPS IN FLOW CHART SHOWN IN FIG. 6 |
| 4TH DATA PROC PROGRAM<br>PROGRAM CODE GROUP CORRESPONDING TO<br>STEPS IN FLOW CHART SHOWN IN FIG. 9 |
| 5TH DATA PROC PROGRAM<br>PROGRAM CODE GROUP CORRESPONDING TO<br>STEPS IN FLOW CHART SHOWN IN FIG. 10 |
|  |

MEMORY MAP OF STORAGE MEDIUM

PRINT APPARATUS, PRINT CONTROL METHOD, STORAGE MEDIUM STORING COMPUTER-READABLE PROGRAM, AND PROGRAM

BACKGROUND OF THE INVENTION

1. Field of the Invention

The present invention relates to a print apparatus which is equipped with a memory capable of holding compressed and already-extracted print information of plural pages transferred from a host computer, a print control method which is applicable to the print apparatus, a storage medium which stores a computer-readable program for executing the print control method, and the program.

2. Related Background Art

Conventionally, in a host-base printer, a whole system concerning printing is reset every time the printing of one page ends. Therefore, even when the size of fed paper is smaller than the paper size to which the printing is requested from a host computer and the number of generation of horizontal sync signals from a printer engine is smaller than the expected number, nonconformity does not occur in print data, whereby any incorrect print data is not output.

However, in recent years, the performance of host computer improves, and host interface technique improves, whereby host-base printer technique is applicable to a higher-speed printer engine.

Moreover, to improve the print performance, transfer control is executed so that compressed print image data of plural pages are transferred without any discontinuity.

However, in the print control system of this type, when the size of fed paper is smaller than the paper size to which the printing is requested from the host computer, there is a problem that the print data involuntarily remains because the expected number of generation of the horizontal sync signals is small, and thus incorrect or wrong data is output in the printing of a next page.

To solve this problem, there has been disclosed Japanese Patent Application Laid-Open No. 2000-296657 (hereinafter called a document 1). More specifically, the document 1 proposes a method that a horizontal sync signal which is input to an image data output control circuit is devised so as to be able to be controlled from a CPU (central processing unit) mounted on a controller. Thus, according to this method, even when a paper to which the printing has been executed is discharged and the horizontal sync signal (BD) supplied from the printer engine is stopped, a pseudo horizontal sync signal (BD) is generated to output the remaining print data.

However, in the method proposed in the document 1, a time for continuously generating the pseudo horizontal sync signals (BD) is necessary. For this reason, the proposed method cannot deal with a high-speed printer engine of the type of feeding a next paper before starting the printing and of stopping or holding the fed next paper inside the body of the printer engine until the printing for the previous paper ends. This is because, if the method proposed in the document 1 is applied to the above high-speed printer engine, a problem that the next paper is fed up to the image formation position while the pseudo horizontal sync signal (BD) is being output occurs. Thus, due to this problem, an incorrect or wrong print result is output, whereby paper resources are wasted.

SUMMARY OF THE INVENTION

The present invention has been made in order to solve the above conventional problem, and an object thereof is to provide a print apparatus which is equipped with a memory capable of holding compressed print information of plural pages transferred from a host computer, characterized in that, when it is detected that a paper size of the page being subjected to a print process does not conform to the size of a paper supplied to a printer engine unit, a reading position of the print information of each page read from the memory of holding the compressed print information of the plural pages is set to the head position of a next page. Thus, in the case where the compressed print information of the plural pages transferred from the host computer can be held, even where the status that the paper size of the page being subjected to the print process does not conform to the size of the paper supplied to the printer engine unit occurs, the process of the print information which is not actually executed with respect to the page where such nonconformity occurs is abandoned, and the already-extracted print information can be processed from the head position of the next page, whereby it is possible by simple constitution to acquire a host-base print environment which can continue the page process from which the correct print result can be acquired and thus can process the already-extracted print information of the plural pages at high speed. Moreover, the object of the present invention is to further provide a print control apparatus which is applicable to the above print apparatus, a print control method which is also applicable to the above print apparatus, a storage medium which stores a computer-readable program for achieving the above print control method, and the program itself.

Another object of the present invention is to provide a print apparatus which comprises:

a memory unit adapted to be able to store compressed print information of at least two or more pages transmitted from a host computer;

an indication unit adapted to indicate a read address of the compressed print information to be read from the memory unit;

an extraction unit adapted to extract the compressed print information read from the memory unit and to output the extracted print information;

an output unit adapted to output the extracted print information output from the extraction unit;

an image formation unit, connected to the output unit, adapted to execute image formation based on the extracted print information received through the output unit;

a detection unit adapted to detect nonconformity between a size of an image of the page to which the image formation unit is executing the image formation and a paper size of a paper fed for the image formation; and a control unit adapted to execute control so as to abandon the compressed print information, for the page to which the image formation unit is executing the image formation, which is stored in an area subsequent to the read address indicated by the indication unit on the memory unit at a point of time when the detection unit detects the nonconformity.

Here, for example, it is preferable that, after the extraction unit extracts the compressed print information, the control unit executes the control so as to abandon the compressed print information, for the page to which the image formation unit is executing the image formation, which is stored in the area subsequent to the read address indicated by the indication unit on the memory unit at the point of time when the detection unit detects the nonconformity.

Here, for example, it is preferable that the compressed print information includes end code information indicating an end of page, and the control unit executes the abandonment of the compressed print information until the extraction unit extracts the end code information.

Here, for example, it is preferable that the abandonment of the compressed print information by the control unit includes not to output the compressed print information to the output unit.

Here, for example, it is preferable that the detection unit detects that the paper size of the paper fed for the image formation is smaller than the size of the image of the page to which the image formation unit is executing the image formation.

Here, for example, it is preferable that the detection unit detects that a length in a paper transportation direction of the paper size of the paper fed for the image formation is shorter than the size of the image of the page to which the image formation unit is executing the image formation.

Here, for example, it is preferable that the print apparatus further comprises a page head address management unit adapted to manage an address of data corresponding to the head of the page in the compressed print information stored by the memory unit, and the control unit determines a data amount to be abandoned, based on the read address indicated by the indication unit on the memory unit at the point of time when the detection unit detects the nonconformity and a head address, managed by the head address management unit, of the compressed print information of a page subsequent to the page on which the nonconformity occurs.

Moreover, another object of the present invention is to provide a print control method which comprises the steps of:

storing compressed print information transmitted from a host computer in a memory unit capable of storing the compressed print information of at least two or more pages;

indicating a read address of the compressed print information to be read from the memory unit;

extracting the compressed print information read from the memory unit and outputting the extracted print information;

outputting the extracted print information to an image formation unit;

detecting nonconformity between a size of an image of the page to which the image formation unit is executing image formation and a paper size of a paper fed for the image formation; and executing control so as to abandon the compressed print information, for the page to which the image formation unit is executing the image formation, which is stored in an area subsequent to the read address on the memory unit indicated at a point of time when the nonconformity is detected.

Moreover, another object of the present invention is to provide a computer program for causing a computer to execute a print control method, comprising:

a memory module for storing compressed print information transmitted from a host computer in a memory unit capable of storing the compressed print information of at least two or more pages;

an indication module for indicating a read address of the compressed print information to be read from the memory unit;

an extraction module for extracting the compressed print information read from the memory unit and outputting the extracted print information;

an output module for outputting the extracted print information to an image formation unit;

a detection module for detecting nonconformity between a size of an image of the page to which the image formation unit is executing image formation and a paper size of a paper fed for the image formation; and a control module for executing control so as to abandon the compressed print information, for the page to which the image formation unit is executing the image formation, which is stored in an area subsequent to the read address on the memory unit indicated at a point of time when the nonconformity is detected.

Incidentally, the present invention can be achieved by also a computer-readable storage medium which stores a computer program for causing a computer to execute a print control method, the program comprising:

a memory module for storing compressed print information transmitted from a host computer in a memory unit capable of storing the compressed print information of at least two or more pages;

an indication module for indicating a read address of the compressed print information to be read from the memory unit;

an extraction module for extracting the compressed print information read from the memory unit and outputting the extracted print information;

an output module for outputting the extracted print information to an image formation unit;

a detection module for detecting nonconformity between a size of an image of the page to which the image formation unit is executing image formation and a paper size of a paper fed for the image formation; and a control module for executing control so as to abandon the compressed print information, for the page to which the image formation unit is executing the image formation, which is stored in an area subsequent to the read address on the memory unit indicated at a point of time when the nonconformity is detected.

The above described objects and another object of the present invention will become apparent from the following description in conjunction with the accompanying drawings.

DETAILED DESCRIPTION OF THE PREFERRED EMBODIMENTS

Hereinafter, the best mode for executing the present invention will be explained in detail with reference to the accompanying drawings.

First Embodiment

Figure 1:
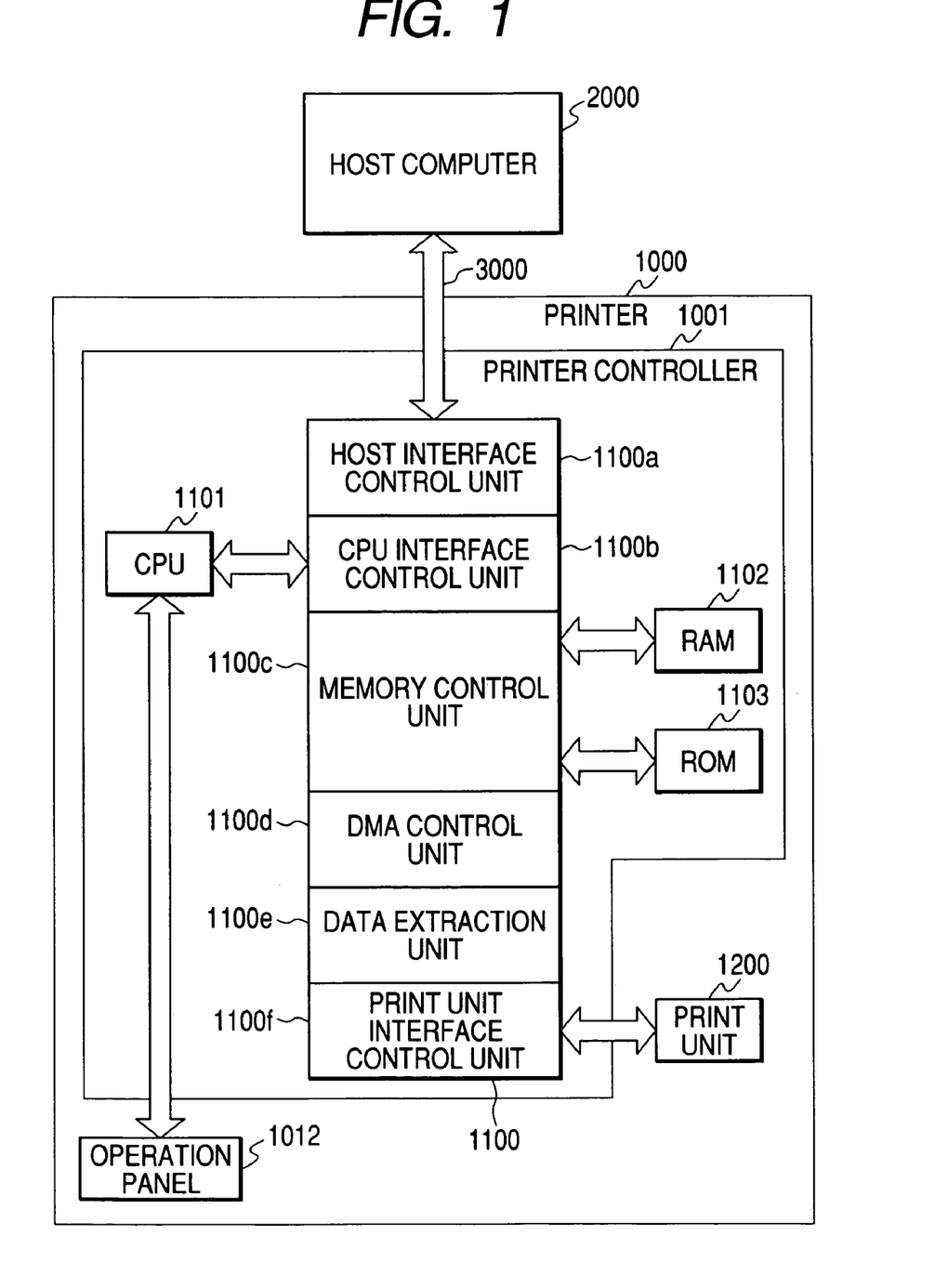
FIG. 1 a block diagram showing an example of a print system to which the print apparatus according to the first embodiment of the present invention is applied.

FIG. 1 a block diagram showing an example of a print system to which the print apparatus according to the first embodiment of the present invention is applied. Here, it should be noted that this example corresponds to a constitution example of the print apparatus, particularly a laser beam printer (hereinafter, simply called a printer), to which the present invention is appropriately applicable.

As shown in FIG. 1, a printer 1000 is connected through a communication line 3000 to a host computer 2000 such as a personal computer or the like which acts as an information processing apparatus, whereby the printer 1000 and the host computer 2000 together constitute the print system.

In the printer 1000, numeral 1001 denotes a printer controller which is the control unit for controlling the whole operation of the printer 1000. Further, in the printer controller 1001, numeral 1101 denotes a CPU which executes a control program stored in a ROM (read only memory) 1103 to control the control unit as a whole.

Numeral 1102 denotes a RAM (random access memory) which is used as a working area for the CPU 1101, and also functions as a reception area for receiving print data transmitted from the host computer 2000. Numeral 1100 denotes an ASIC (application specific integrated circuit) which includes a host interface control unit 1100a, a CPU interface control unit 1100b, a memory control unit 1100c, a DMA (direct memory access) control unit 1100d, a data extraction unit 1100e, a printer unit interface control unit 1100f, and the like.

The host interface control unit 1100a controls transmission/reception of a print control command, print image data and the like to/from the host computer 2000 through the communication line 3000. Moreover, the host interface control unit 1100a cooperates with the DMA control unit 1100d and the memory control unit 1100c to store the received print image data in the RAM 1102.

The CPU interface control unit 1100b interfaces with the CPU 1101, and further executes access control to a control register and a data register (both not shown) provided in the ASIC 1100.

The memory control unit 1100c executes access control to the ROM 1103 and the RAM 1102, the data extraction unit 1100e extracts (or decompresses) the compressed print image data received from the host computer 2000, and the print unit interface unit 1100f controls exchange of a control signal with a print unit 1200 and shipping of the print image data. Incidentally, numeral 1012 denotes an operation panel.

Figure 2:
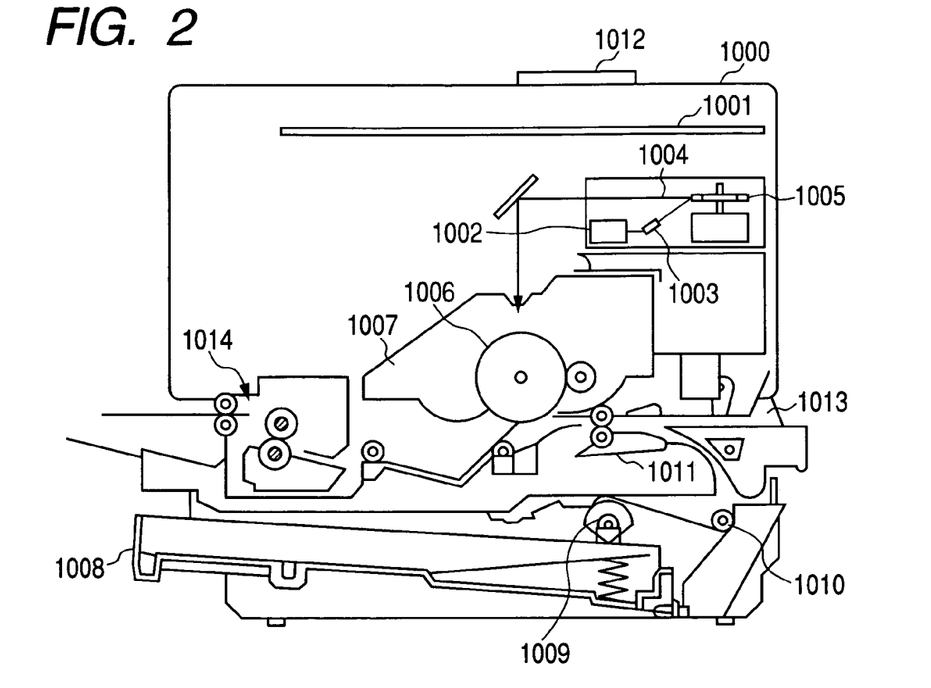
FIG. 2 is a cross sectional diagram for explaining the schematic constitution of the print apparatus shown in FIG. 1.

FIG. 2 is a cross sectional diagram for explaining the schematic constitution of the printer 1000 shown in FIG. 1. Here, it should be noted that this constitution corresponds to the constitution example of the print apparatus, particularly the printer, to which the present invention is appropriately applicable. Moreover, it should be noted that, in FIG. 2, the same reference numeral as that shown in FIG. 1 denotes the same element as that shown in FIG. 1.

In FIG. 2, the printer 1000 receives the compressed print image data transmitted from the externally connected information processing apparatus such as the host computer or the like, extracts the received data, and then transfers the extracted data to the print unit 1200 to print an image on a recording paper or the like being a recording medium. Moreover, switches for user's operations, an LCD (liquid crystal display) and the like are disposed on the operation panel 1012.

The printer controller 1001 controls the whole of the printer 1000. More specifically, the printer controller 1001 mainly converts image information into a video signal of an image pattern corresponding to the image information, and outputs the acquired video signal to a laser driver 1002. Here, the laser driver 1002 executes ON/OFF switching of a laser beam 1004 emitted from a semiconductor laser 1003. Further, the laser beam 1004 is swung from side to side by a rotational polyhedral mirror 1005 so as to scan and expose the surface of an electrostatic drum 1006.

Thus, an electrostatic latent image corresponding to the image pattern is formed on the electrostatic drum 1006. Incidentally, the formed electrostatic latent image is developed by a developing unit 1007 disposed on the periphery of the electrostatic drum 1006, and the developed image is transferred onto the recording paper. Here, it should be noted that a cut sheet is used as the recording paper. The cut-sheet recording paper which is held in a paper cassette 1008 inserted into the printer 1000 is transported into the printer 1000 through a paper feed roller 1009 and transportation rollers 1010 and 1011, and thus supplied to the electrostatic drum 1006. Then, printing is executed through a series of such operations.

Numeral 1013 denotes a manual paper insertion port which is the paper port used to feed the paper set by a user to the image formation unit. Incidentally, it should be noted that the paper cassette 1008 does not have any mechanism for detecting the size of the set recording paper in the present embodiment.

Numeral 1014 denotes a paper discharge sensor which detects the trailing edge of the paper to which the image formation has been executed. When the trailing edge of the image-formed paper is detected by the paper discharge sensor 1014, the print unit 1200 shown in FIG. 1 stops generating a horizontal sync signal (BD).

Then, in the above-constituted print system according to the present invention, the print apparatus to which print data forced abandonment being the featured of the present invention is applied will be explained hereinafter.

Figure 3:
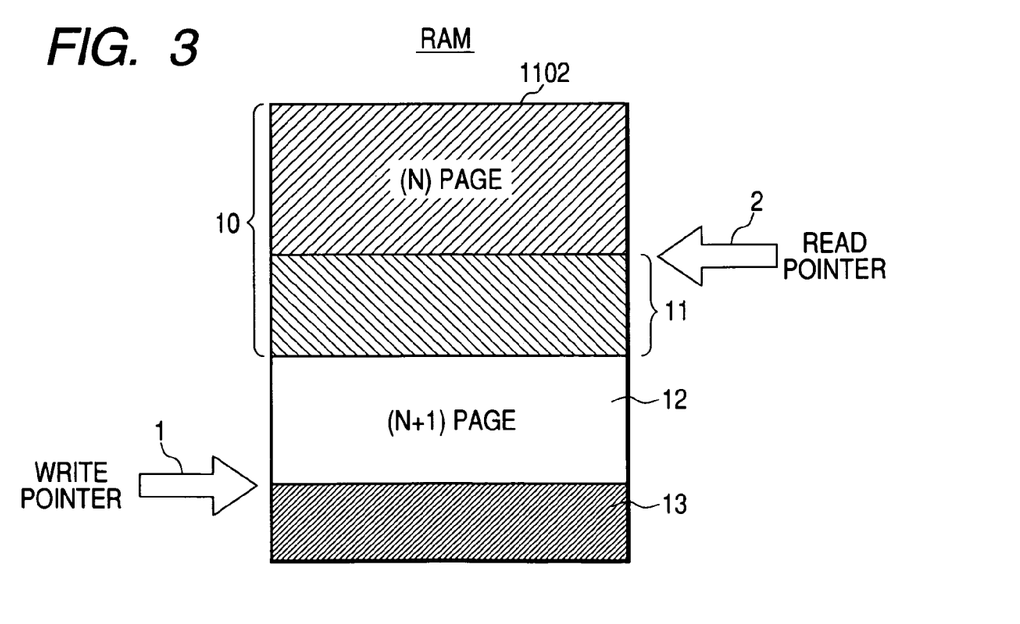
FIG. 3 is a schematic diagram for explaining the memory map of a RAM shown in FIG. 1.

FIG. 3 is a schematic diagram for explaining the memory map of the RAM 102 shown in FIG. 1. Here, it should be noted that the memory map indicates the status of the print data stored in the RAM 1102 in a case where a ring memory is constituted and each page of the print data is written, and also in a case where the size of the fed paper is smaller than the paper size to which the printing is requested from the host computer.

In FIG. 3, a write pointer 1 and a read pointer 2 are generated by the memory control unit 1100c. Here, in the printing of the image data of an N page, it is assumed that the size of the fed paper is smaller than the image data and the horizontal sync signal is stopped after the trailing edge of the paper passed the paper discharge sensor 1014. In this case, although the print data to be output under normal conditions corresponds to a shaded portion 10, the read pointer 2 is stopped by the memory control unit 1100c as a shaded portion 11 remains. At that time, the memory already starts to store the image data of an (N+1) page. Therefore, if the printing is continued as it is, the reading start position (that is, the position indicated by the read pointer 2) for starting the reading of the print data of the (N+1) page is shifted (or mispositioned). For this reason, although the read pointer 2 indicates the line and the position of the print data of the (N+1) page under normal conditions, this pointer indicates a wrong position due to the stop of the horizontal sync signal, whereby wrong (or incorrect) printing occurs. Here, it should be noted that, in the wrong printing, the phenomenon that a printed image is broken occurs. Incidentally, numeral 12 denotes a next page area, and numeral 13 denotes a free (or vacant) area.

Consequently, in the present embodiment, according to flow charts respectively shown in later-described FIGS. 4 to 6, the increase of the count value of the horizontal sync signals is monitored, and a mode for abandoning the print data when the increase of the count value of the horizontal sync signals is in the status that the horizontal sync signal is wrongly stopped is set. Thus, the extraction process of the data extraction unit 1100e is forcedly executed until the end of the relevant page, whereby the data extraction unit 1100e and the like are forcedly reset. As a result, the read pointer 2 on the ring memory secured on the RAM 102 is positioned at the head of the next page, whereby the conventional wrong printing can be prevented.

Figure 4:
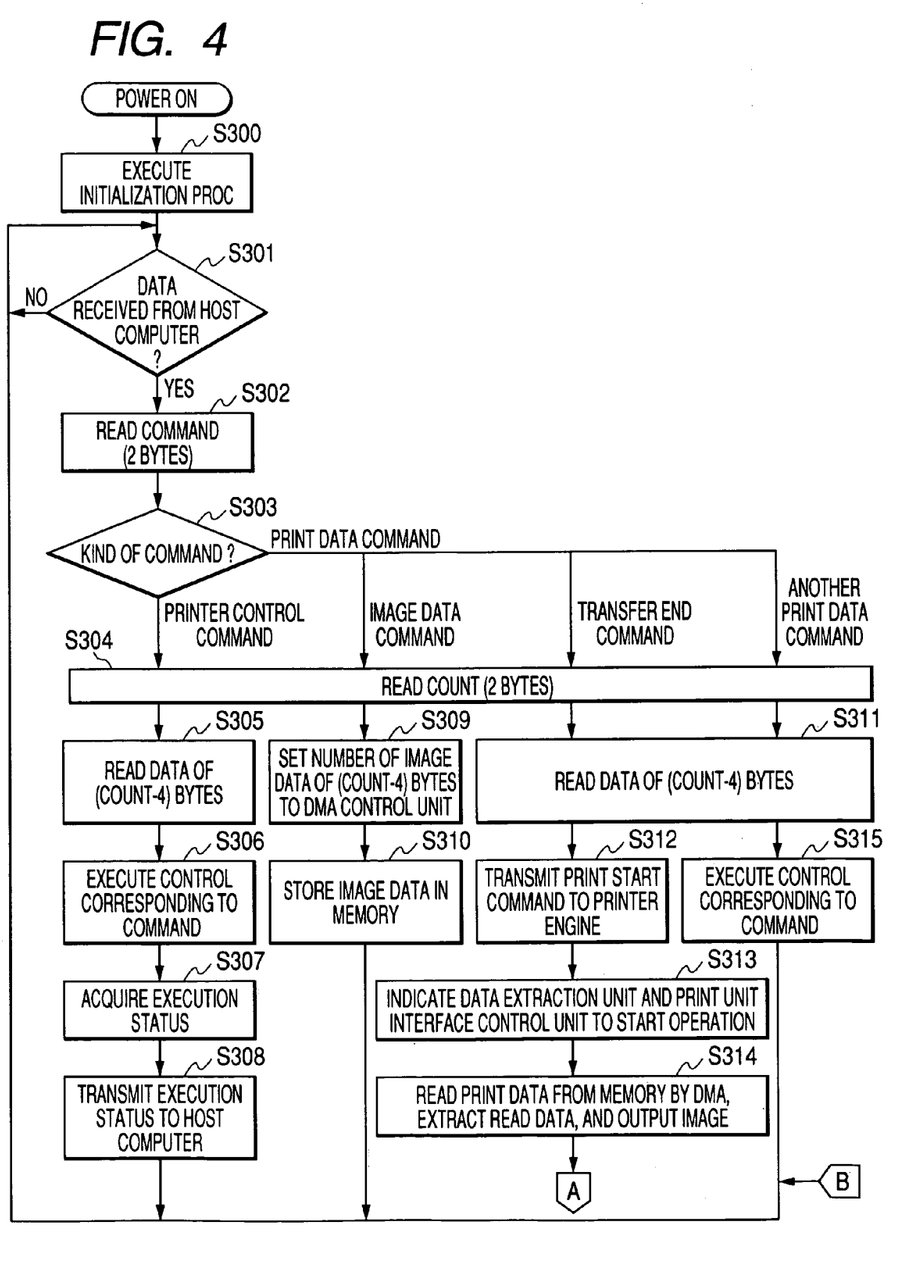
FIG. 4 is a flow chart showing an example of a first data processing procedure in the print apparatus according to the present invention.
Figure 5:
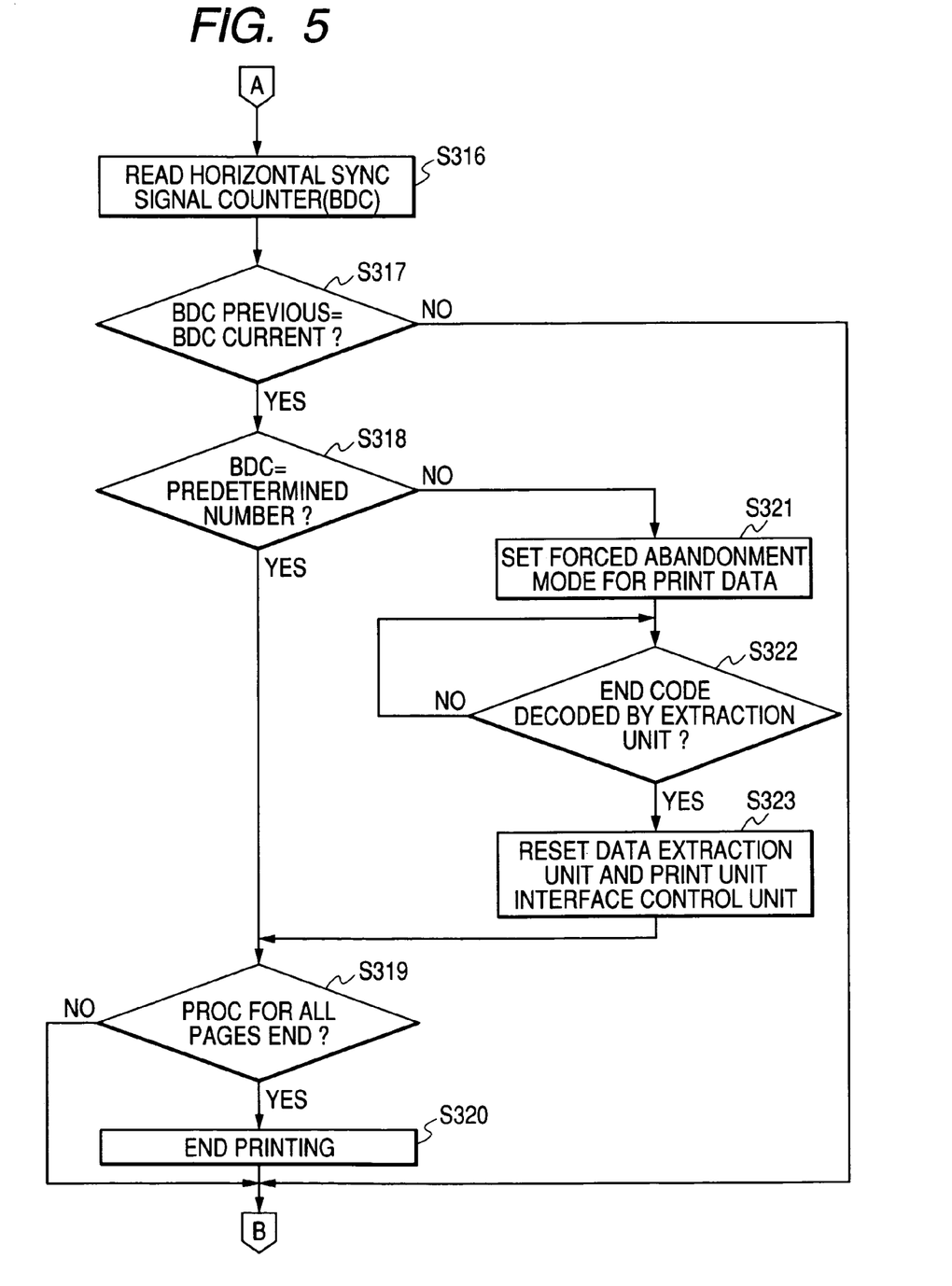
FIG. 5 is a flow chart showing the example of the first data processing procedure in the print apparatus according to the present invention.
Figure 6:
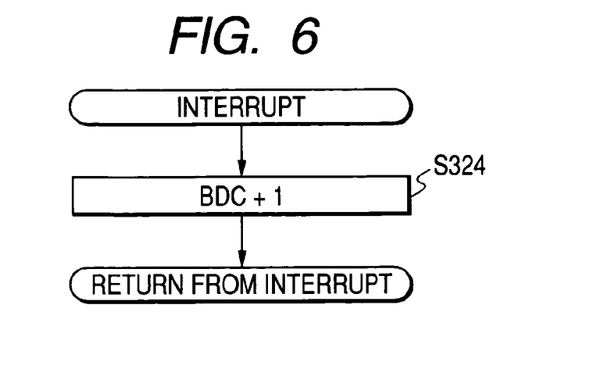
FIG. 6 is a flow chart showing the example of the first data processing procedure in the print apparatus according to the present invention.

FIGS. 4, 5 and 6 are the flow charts showing an example of a first data processing procedure in the print apparatus according to the present embodiment. Here, it should be noted that symbols S300 to S324 in FIGS. 4 to 6 denote respective steps, and these steps are executed by the CPU 1101 which loads the control program stored in the ROM 1103 into the RAM 1102 and then executes the loaded program.

In FIG. 4, when the power supply of the printer is turned on, the CPU 1101 loads and executes the control program stored in the ROM 1103.

First, in the step S300, a not-shown internal register secured on the RAM 1102 is initialized, the connection between the printer controller 1001 and the host computer 2000 through the communication line 3000 is established, and the printer 1000 itself is initialized. Thus, a data reception standby status for waiting the data received from the host computer 2000 is set.

Then, in the step S301, it is judged by the CPU 1101 whether or not the data is received from the host computer 2000. When judged that the data is received from the host computer 2000, the flow advances to the step S302. Meanwhile, when judged that the data is not received from the host computer 2000, the flow stays at the step S301 to continue monitoring of the reception data.

At that time, a standby time may be counted by a not-shown internal counter under the control of the CPU 1101. In such a case, when a certain time previously set in the internal counter elapses, a low power consumption mode such as a sleep mode or the like may be set.

On one hand, in the host computer 2000, when it is indicated by the user to execute the printing, printer driver software starts to analyze graphic data of application software, thereby generating a print image. Then, the print image is comparted into bands, the acquired image data is compressed, and the compressed data is transmitted to the printer 1000 through the communication line 3000.

On the printer side, when the data is received from the host computer 2000 in the step S301, the flow advances to the step S302 to read the reception data of headmost two bytes. Here, it should be noted that the data received through the communication line 3000 is disposed to have the data structure as shown in FIG. 7.

Figures 7, 8:
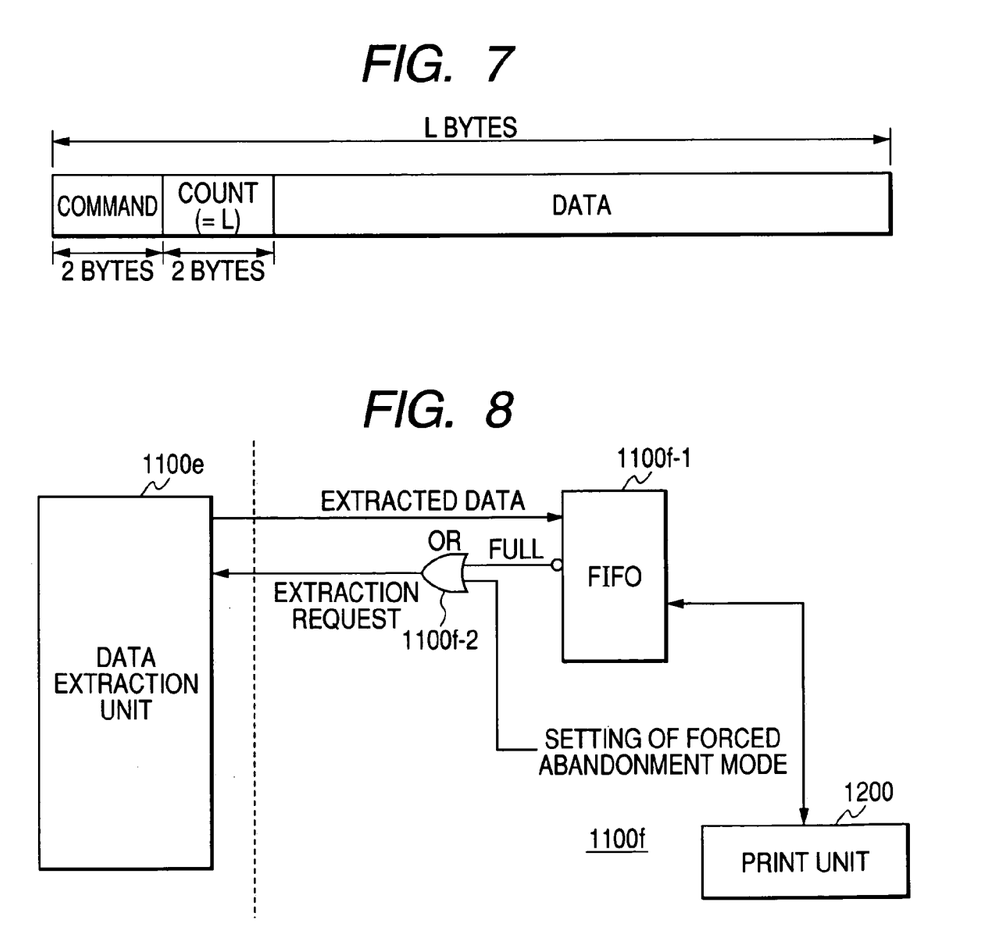
FIG. 7 is a diagram for explaining the data structure of the data received from a host computer shown in FIG. 1.
FIG. 8 is a block diagram showing an example of a forced abandonment mode setting circuit which sets a forced abandonment mode to be notified from a print unit interface control unit to a data extraction unit both shown in FIG. 1.

FIG. 7 is the diagram for explaining the data structure of the data received from the host computer 2000 shown in FIG. 1.

In the present embodiment, as shown in FIG. 7, the headmost two bytes of the reception data correspond to a command, the next two bytes correspond to a command length (i.e., count value (=L)), and the subsequent bytes correspond to the essential data. Since the command length is represented by two bytes, i.e., 16 bits, the whole command length is represented by less than 64 kilobytes (KB). In any case, it should be noted that such a command system is merely one example, that is, the command system can be changed according to the system constitution.

Subsequently, in the step S303, a kind of command read in the step S302 is discriminated. Here, the command is roughly classified into a printer control command and a print data command, and the print data command is further classified into an image data command, a transfer end command, and another print data command. In any case, it should be noted that the printer operates according to the kind of command.

Consequently, in the step S304, the count value of two bytes subsequent to the command of headmost two bytes is read to discriminate the command length. Here, it should be noted that a next operation step to be executed is different according to the discriminated kind of command.

That is, when it is discriminated in the step S303 that the command is the printer control command, the flow advances to the step S305 to receive all the data of (count−4) bytes. Here, the data of (count−4) bytes is acquired by subtracting the command of two bytes and the count of two bytes from the count value indicating the command length.

Then, the control corresponding to the command is executed in the step S306, and an execution status ("OK", "NG", etc.) is acquired in the step S307. Subsequently, in the step S308, the acquired execution status is transmitted to the host computer 2000, and then the flow returns to the step S301 to continue monitoring of next reception data.

In the meantime, when it is discriminated in the step S303 that the command is the image data command (included in the print data command), the flow advances to the step S304 to read the count value of two bytes subsequent to the command of headmost two bytes so as to discriminate the command length. After then, in the step S309, the number of image data of (count−4) bytes is set in the DMA control unit 1100d which controls the DMA transfer. The DMA starts operating by this setting, and the image data is stored in a predetermined area of the memory (RAM 1102) in the step S310. Then, the flow returns to the step S301. Here, it should be noted that the step S310 is the step which is executed by hardware.

Moreover, when it is discriminated in the step S303 that the command is the transfer end command (included in the print data command), the flow advances to the step S304 to read the count value of two bytes subsequent to the command of headmost two bytes so as to discriminate the command length. After then, the flow advances to the step S311 to read the remaining data of (count−4) bytes as well as the step S305.

Subsequently, in the step S312, a print start command is transferred to the printer engine (print unit 1200) to indicate the printer engine to start printing. Then, the printer engine which received the print start command starts the above print sequence.

Next, in the step S313, the CPU 1101 indicates the data extraction unit 1100e and the print unit interface control unit 1100f both concerning the printing to start the relevant operations. Then, after the data extraction unit 1100e and the print unit interface control unit 1100f started the respective operations in response to the indication of the CPU 1101, the flow advances to the step S314 to start reading the image data from the memory (RAM 1102) under the control of hardware.

The data extraction unit 1100e receives the data read based on the DMA by the DMA control unit 1100, and executes the extraction operation to the print image data. Then, the extracted print image data is written into an FIFO (first in, first out) memory provided in the print unit interface control unit 1100f.

Subsequently, a not-shown image shipping circuit provided in the print unit interface control unit 1100f receives a vertical sync signal from the printer engine (print unit 1200), acquires a predetermined upper margin and the horizontal sync signal (hereinafter, called a BD signal), counts a predetermined left margin (or a right margin according to a kind of printer engine), and transfer the print image data to the printer engine. Then, the flow advances to the step S316 and the following steps.

Moreover, when it is discriminated in the step S303 that the command is another print data command, the flow advances to the step S311 to read the remaining data of (count−4) bytes, and further advances to the step S315 to execute the control according to the command. Then, the flow returns to the step S301.

Subsequently, in the step S316 of FIG. 5, a horizontal sync signal counter (BDC) is read. Here, as shown in FIG. 6, the horizontal sync signal counter (BDC) is processed in the interrupt routine, and incremented by "+1" every time the horizontal sync signal is input in the step S324. Here, it should be noted that the initialization is executed after the printing of one page ended.

Then, in the step S317, the previously read horizontal sync signal counter value (BDC previous) is compared with the currently read horizontal sync signal counter value (BDC current) to judge whether or not both the values conform to each other. When judged that both the values do not conform to each other (in case of "NO"), it is judged that the image is being output yet. Meanwhile, when judged that both the values conform to each other (in case of "YES"), it means that the BD signal-stops, whereby it is judged that the image output ends.

Here, it is assumed that the processing speed of the CPU 1101 is sufficiently low as compared with the interrupt interval of the BDC process. Incidentally, when the processing speed of the CPU 1101 is high, it is possible to read the count value at certain intervals by starting the operation of a timer at the same time as the print's starting and thus using interrupt of the timer.

Next, in the step S318, it is judged by the CPU 1101 whether or not the count value of the horizontal sync signal counter (BDC) reaches a predetermined number of the paper size to which printing is requested. When judged that the count value of the horizontal sync signal counter (BDC) reaches the predetermined number (in case of "YES"), the flow advances to the step S319. Meanwhile, when judged that the count value of the horizontal sync signal counter (BDC) does not reach the predetermined number (in case of "NO") yet, it is judged that the size of the fed paper is smaller than the paper size to which the printing is requested from the host computer (particularly, the length of the paper in the paper transporting direction, i.e., sub scan direction, is short), and the flow advances to the step S321.

Then, in the step S319, it is judged by the CPU 1101 whether or not the output of all the pages to which the printing is requested ends. When judged that the output of all the pages to which the printing is requested ends (in case of "YES"), the flow advances to the step S320 to end the print process, and the flow returns to the step S301 to wait for a next print job.

Meanwhile, when judged in the step S319 that the output of all the pages to which the printing is requested does not end (in case of "NO"), the next page which is not yet printed is subjected to the printing.

Then, in the step S321, a forced abandonment mode for the print data which is the characteristic of the present invention is set.

By setting the forced abandonment mode, as shown in FIG. 8, an extraction request signal to be transferred to the data extraction unit 1100e is forcedly set to "true". While the extraction request signal is being set to "true", the data extraction unit 1100e continues the data extraction process until an end code included in the image data is decoded.

FIG. 8 is the block diagram showing an example of a forced abandonment mode setting circuit which sets the forced abandonment mode to be notified from the print unit interface control unit 1100f to the data extraction unit 1100e both shown in FIG. 1. Here, it should be noted that, in FIG. 8, the same reference numeral as that shown in FIG. 1 denotes the same element as that shown in FIG. 1.

In FIG. 8, the data extracted by the data 10 extraction unit 1100e are sequentially written in an FIFO memory 1100f-1 provided in the print unit interface control unit 1100f. Then, when the data of a certain amount are written in the FIFO memory 1100f-1, a signal FULL representing a memory full status is notified to the data extraction unit 1100e through an OR gate 1100f-2. Accordingly, the extraction request signal is forcedly set to "true".

At the same time, in the OR gate 1100f-2, the extraction request signal is forcedly set to "true" by the process of setting the forced abandonment mode.

Therefore, in the present embodiment, when the forced abandonment mode is set in the step S321, the extraction request signal to be transferred to the data extraction unit 1100e is forcedly set to "true", and the data extraction unit 1100e continues the data extraction process until the end of the relevant page is detected. Accordingly, it is possible to forcedly set the read pointer 2 of the ring memory from the halfway position of the previous page to the head position of the next page.

In the subsequent step S322, it is judged whether or not the end code is decoded by the data extraction unit 1100e. When judged that the end code is decoded (in case of "YES"), the flow advances to the step S323 to reset the data extraction unit 1100e and the print unit interface control unit 1100f so as to be prepared for the printing of the next page. Then, the flow advances to the step S319.

Meanwhile, when judged in the step S322 that the end code is not decoded yet (in case of "NO"), an end flag is successively monitored until the decoding ends. The memory read pointer on the RAM 1102 after the forced abandonment mode was executed is set at the head position of the next page, whereby any wrong printing is not executed for the next page.

As explained above, according to the present embodiment, even in the case where the size of the fed paper is smaller than the paper size to which the printing is requested, it is judged in the step S318 that the count value of the horizontal sync signal counter (BDC) does not reach the predetermined number (in case of "NO"), and the forced abandonment mode is set to forcedly abandon the relevant print data, whereby the print data of the next page is not abandoned in the memory. As a result, it is possible to constitute the host-base printer which can normally continue the print process for the next page, and it is also possible to deal with the printer engine of more higher speed.

As just described, in the first embodiment, until the page end is detected, the data is extracted and the extracted data is abandoned. Then, when the page end is detected, the data extraction and data abandonment end, whereby the data to be next read is necessarily the data of the head of the next page. As a result, since positive or active control to set the read pointer to the head of the next page is not executed, it is unnecessary to additionally provide any software for controlling the pointer, and it is thus possible to easily achieve the print control.

Second Embodiment

In the above first embodiment, according to the flow charts respectively shown in FIGS. 4 to 6, the count value of the BD signal is monitored, and the mode for abandoning the print data of the previous page is set when the BD signal is in the wrong status. Thus, the extraction process of the data extraction unit 1100e is forcedly executed until the page end of the previous page, whereby the data extraction unit 1100e is forcedly reset. In consequence, the read pointer 2 on the ring memory secured on the RAM 102 is controlled to indicate the head of the next page. However, it is also possible to eliminate the wrong printing in the following method. That is, in this method, a data amount to be abandoned is calculated based on the value that the count of the BD signal stops, the size of the ring memory, the head address of the page immediately before the count of the BD signal stops, and the like, and, based on the calculated amount, the read pointer 2 or the like is again set so as to indicate the head address of the next page. Hereinafter, the second embodiment will be explained in detail.

Figure 9:
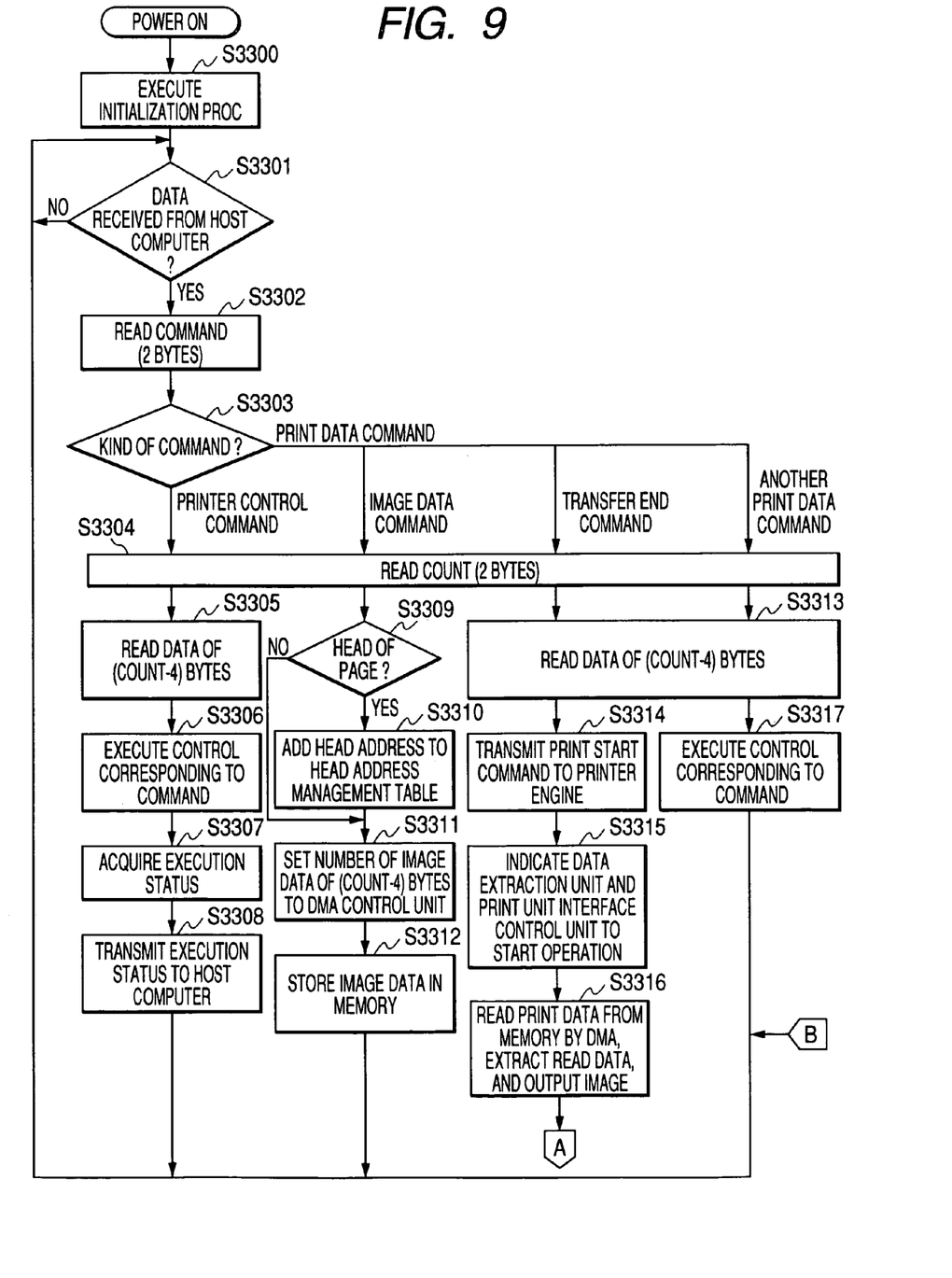
FIG. 9 is a flow chart showing an example of a second data processing procedure in the print apparatus according to the present invention.
Figure 10:
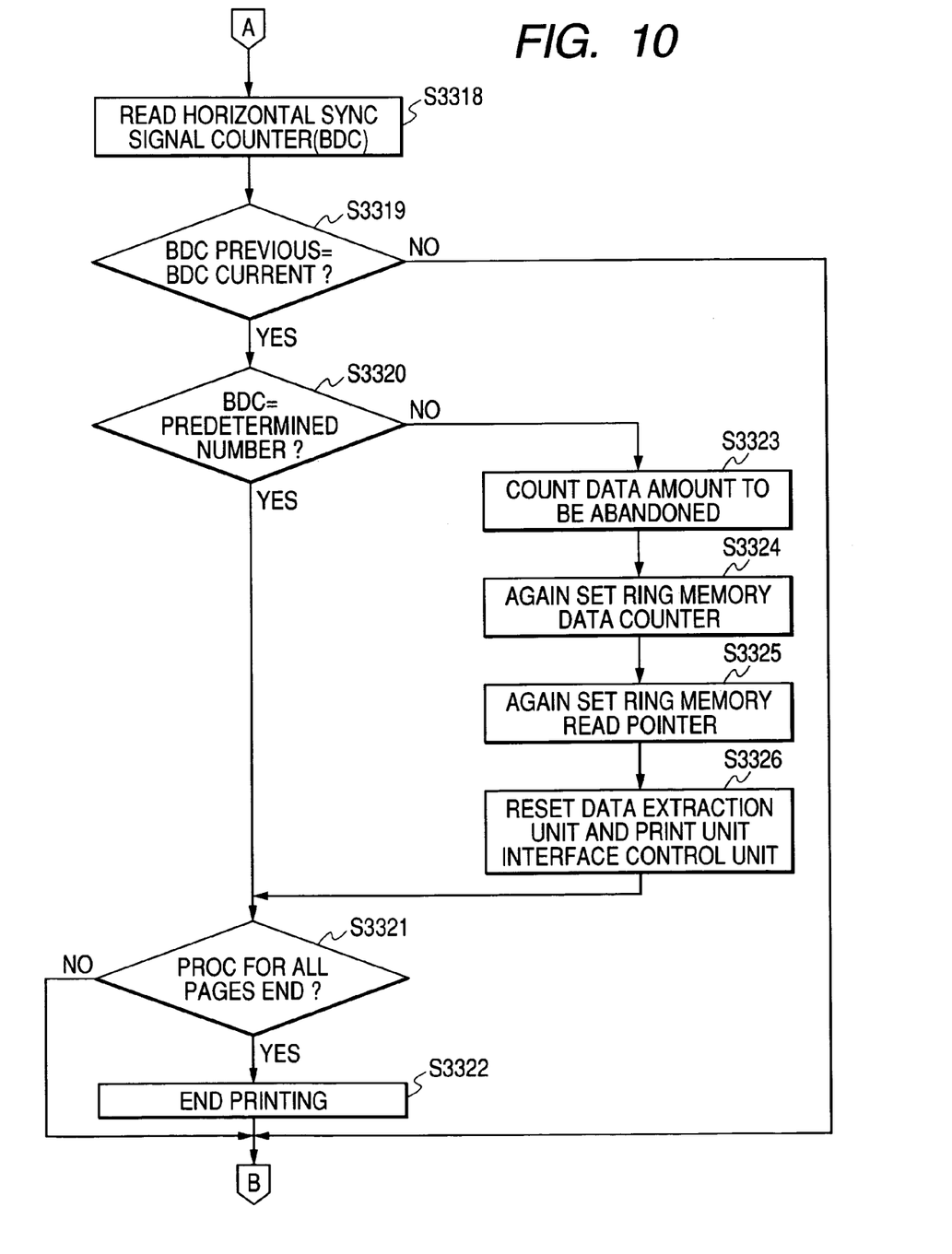
FIG. 10 is a flow chart showing the example of the second data processing procedure in the print apparatus according to the present invention.

FIGS. 9 and 10 are flow charts showing an example of a second data processing procedure in the print apparatus according to the present embodiment. Here, it should be noted that symbols S3300 to S3326 in FIGS. 9 and 10 denote respective steps, and these steps are executed by the CPU 1101 which loads the control program stored in the ROM 1103 into the RAM 1102 and then executes the loaded program.

In FIG. 9, when the power supply of the printer is turned on, the CPU 1101 loads and executes the control program stored in the ROM 1103. First, in the step S3300, the not-shown internal register secured on the RAM 1102 is initialized, the connection between the printer controller 1001 and the host computer 2000 through the communication line 3000 is established, and the printer 1000 itself is initialized. Thus, a data reception standby status for waiting the data received from the host computer 2000 is set.

Then, in the step S3301, it is judged by the CPU 1101 whether or not the data is received from the host computer 2000. When judged that the data is received from the host computer 2000, the flow advances to the step S3302. Meanwhile, when judged that the data is not received from the host computer 2000, the flow stays at the step S3301 to continue monitoring of the reception data. At that time, a standby time may be counted by the not-shown internal counter under the control of the CPU 1101. In such a case, when a certain time previously set in the internal counter elapses, a low power consumption mode such as a sleep mode or the like may be set.

On one hand, in the host computer 2000, when it is indicated by the user to execute the printing, the printer driver software which has been installed in the hard disk or the like and is resident on the system area of the RAM 1102 starts to analyze the graphic data of the application software, thereby generating an print image. Then, the print image is comparted into the bands, the acquired image data is compressed, and the compressed data is transmitted to the printer 1000 through the communication line 3000.

On the side of the printer 1000, when the data is received from the host computer 2000 in the step S3301, the flow advances to the step S3302 to read the reception data of headmost two bytes. Here, it should be noted that the data received through the communication line 3000 is disposed to have the data structure as shown in FIG. 7. As shown in FIG. 7, the headmost two bytes of the reception data correspond to the command, the next two bytes correspond to the command length (i.e., count value (=L)), and the subsequent bytes correspond to the essential data. Since the command length is represented by two bytes, i.e., 16 bits, the whole command length is represented by less than 64 KB. In any case, it should be noted that such a command system is merely one example, that is, the command system can be changed according to the system constitution.

Subsequently, in the step S3303, a kind of read command is discriminated. In the present embodiment, the command is roughly classified into a printer control command and a print data command, and the print data command is further classified into an image data command, a transfer end command, and another print data command. In any case, it should be noted that the printer operates according to the kind of command.

Then, in the step S3304, the count value of two bytes subsequent to the command is read to discriminate the command length. Here, it should be noted that a next operation step to be executed is different according to the discriminated kind of command.

That is, when it is discriminated in the step S3303 that the command is the printer control command, the flow advances to the step S3304 to read the count value, and the flow further advances to the step S3305 to receive all the data of (count−4) bytes. Here, the data of (count−4) bytes is acquired by subtracting the command of two bytes and the count of two bytes from the count value indicating the command length.

Then, the control corresponding to the command is executed in the step S3306, and an execution status ("OK", "NG", etc.) is acquired in the step S3307. Subsequently, in the step S3308, the acquired execution status is transmitted to the host computer 2000. Then, after the execution status was transmitted, the flow returns to the step S3301 to continue monitoring of next reception data.

In the meantime, when it is discriminated in the step S3303 that the command is the image data command (included in the print data command), the flow advances to the step S3304 to read the count value, and the flow further advances to the step S3309 to judge whether or not the relevant image data corresponds to the head of the page. When judged that the image data corresponds to the head of the page (in case of "YES"), the flow advances to the step S3310 to add and register the head address to a head address management table which is used to manage and control the head address of the stored address with respect to each page.

On the contrary, when judged in the step S3309 that the image data does not correspond to the head of the page (in case of "NO"), the flow advances to the step S3311. In the step S3311, the number of image data of (count−4) bytes is set in the DMA control unit 1100d which controls the DMA transfer. The DMA starts operating by this setting, and the image data is stored in a predetermined area of the memory in the step S3312. Then, the flow returns to the step S3301. Here, it should be noted that the step S3312 is the step which is executed by hardware.

Moreover, when it is discriminated in the step S3303 that the command is the transfer end command (included in the print data command), the flow advances to the step S3304 to read the count value of two bytes subsequent to the command of headmost two bytes so as to discriminate the command length. After then, the flow advances to the step S3313 to read the remaining data of (count−4) bytes as well as the step S3305. Subsequently, in the step S3314, a print start command is transferred to the printer engine (print unit 1200) to indicate the printer engine to start printing.

Then, the printer engine which received the print start command starts the above print sequence. Next, in the step S3315, the CPU 1101 indicates the data extraction unit 1100*e* and the print unit interface control unit 1100*f* both concerning the printing to start the relevant operations. Further, after the data extraction unit 1100*e* and the print unit interface control unit 1100*f* started the respective operations in response to the indication of the CPU 1101, the flow advances to the step S3316 to start reading the image data from the memory (RAM 1102) under the control of hardware. The data extraction unit 1100*e* receives the data read based on the DMA by the DMA control unit 1100, and executes the extraction operation to the print image data. Then, the extracted print image data is written into the FIFO memory (FIG. 8) provided in the print unit interface control unit 1100*f*.

Subsequently, the not-shown image shipping circuit provided in the print unit interface control unit 1100*f* receives a vertical sync signal from the printer engine (print unit 1200), acquires a predetermined upper margin and the horizontal sync signal (hereinafter, called a BD signal), counts a predetermined left margin (or a right margin according to a kind of printer engine), and transfer the print image data to the printer engine. Then, the flow advances to the step S3318 and the following steps.

Moreover, when it is discriminated in the step S3303 that the command is another print data command, the flow advances to the step S3313 to read the remaining data of (count−4) bytes, and further advances to the step S3317 to execute the control according to the command. Then, the flow returns to the step S3301.

Subsequently, in the step S3318 of FIG. 10, a horizontal sync signal counter (BDC) is read. Here, as shown in FIG. 6, the horizontal sync signal counter (BDC) is processed in the interrupt routine, and incremented by "+1" every time the BD signal is input. Here, it should be noted that the initialization is executed after the printing of one page ended.

Then, in the step S3319, the previously read horizontal sync signal counter value (BDC previous) is compared with the currently read horizontal sync signal counter value (BDC current) to judge whether or not both the values conform to each other. When judged that both the values do not conform to each other (in case of "NO"), it is judged that the image is being output yet. Meanwhile, when judged that both the values conform to each other (in case of "YES"), it means that the BD signal stops, whereby it is judged that the image output ends.

Here, it is assumed that the processing speed of the CPU 1101 is sufficiently low as compared with the interrupt interval of the BDC process. Incidentally, when the processing speed of the CPU 1101 is high, it is possible to read the count value at certain intervals by starting the operation of a timer at the same time as the print's starting and thus using interrupt of the timer.

Next, in the step S3320, it is judged by the CPU 1101 whether or not the count value of the horizontal sync signal counter (BDC) reaches a predetermined number of the paper size to which printing is requested. When judged that the count value of the horizontal sync signal counter (BDC) reaches the predetermined number (in case of "YES"), the flow advances to the step S3321. Meanwhile, when judged that the count value of the horizontal sync signal counter (BDC) does not reach the predetermined number (in case of "NO") yet, it is judged that the size of the fed paper is smaller than the paper size to which the printing is requested from the host computer, and the flow advances to the step S3323.

Then, in the step S3321, it is judged whether or not the output of all the pages to which the printing is requested ends. When judged that the output of all the pages to which the printing is requested ends (in case of "YES"), the flow advances to the step S3322 to end the print process, and the flow returns to the step S3301 to wait for a next print job.

Meanwhile, when judged in the step S3321 that the output of all the pages to which the printing is requested does not end (in case of "NO"), the flow returns to the step S3301. Then, the next page which is not yet printed is subjected to the printing.

After then, in steps S3323 to S3326, the forced abandonment mode for the print data which is the characteristic of the present invention is set.

First, in the step S3323, a data amount of the data to be abandoned (called "abandonment data amount") is calculated. Here, it is assumed that the head address of the relevant print page registered in the head address management table is A(n), the head address of the next page is A(n+1), the value of the read pointer of the ring memory at a point of time when the BD signal stops is RP, and the maximum address of the ring memory is AMAX. On that condition, the calculation is executed according to the following equations (1) and (2).

$$\text{abandonment data amount} = AMAX + A(n+1) + 2 - RP \quad (1)$$

(in case of $RP \geq A(n+1)$)

$$\text{abandonment data amount} = A(n+1) - RP + 1 \quad (2)$$

(in case of $RP < A(n+1)$)

Subsequently, in the step S3324, the value acquired by subtracting the abandonment data amount calculated as above is again set to the ring data counter. In the step S3325, the head address A(n+1) of the next page is again set to the read pointer 2 of the ring memory.

In the S3326, the data extraction unit 1100*e* and the print unit interface control unit 1100*f* are reset so as to be prepared for the printing of the next page. Then, the flow advances to the step S3321.

By executing such a series of processes in the forced abandonment mode, the read pointer 2 of the ring memory is normally positioned at the head of the next page, and the value of the data counter of the ring memory becomes consequent, whereby any wrong printing does not occur on the next page.

As explained above, according to the present embodiment, even in the case where the size of the fed paper is smaller than the paper size to which the printing is requested, the forced abandonment mode is set to forcedly abandon the relevant print data, whereby the print data of the next page is not abandoned in the memory. As a result, it is possible to constitute the host-base printer which can normally continue the print process for the next page, and it is also possible to deal with the printer engine of more higher speed.

Hereinafter, the architecture of data processing programs capable of being read by the print system according to the present invention will be explained with reference to a memory map shown in FIG. 11.

Figure 11:
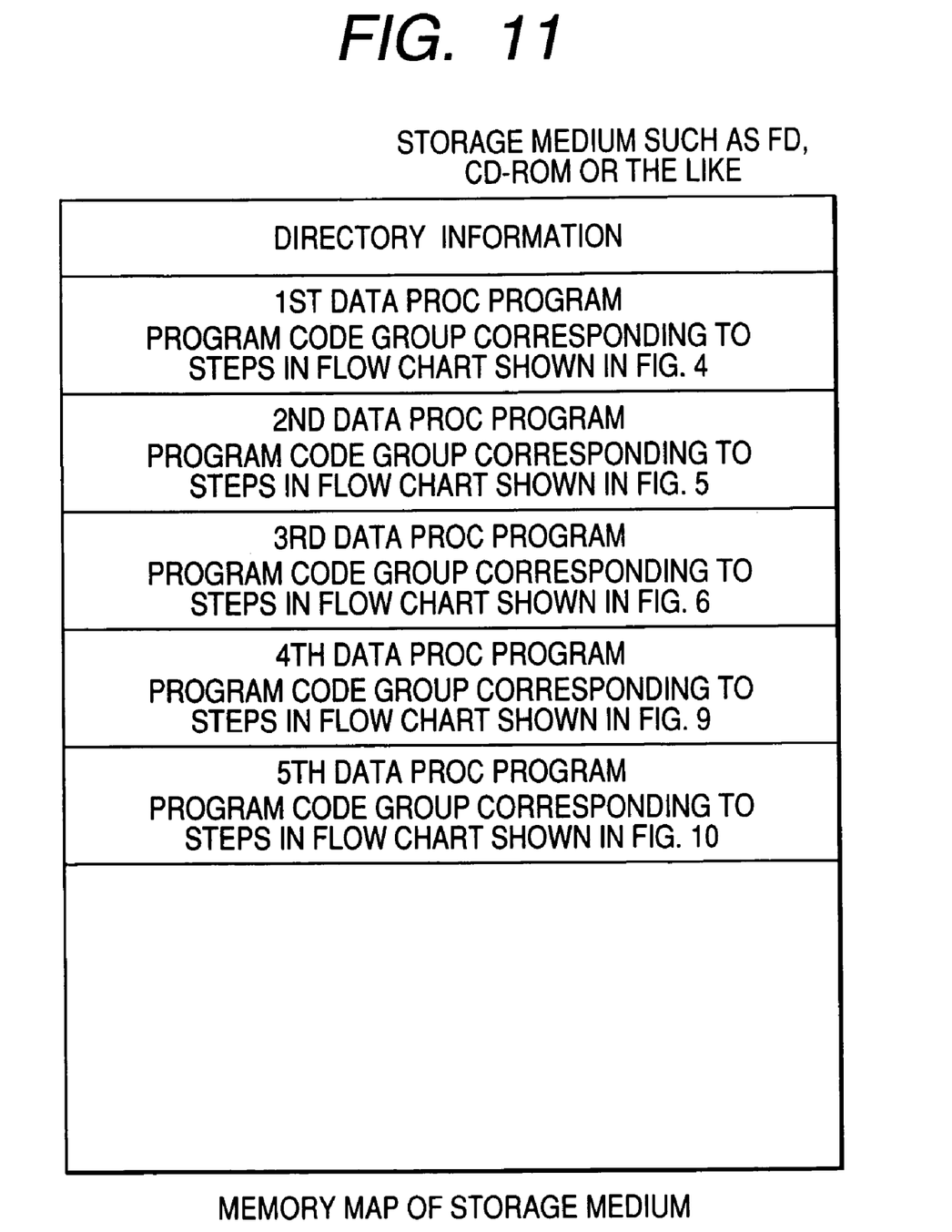
FIG. 11 is a schematic diagram for explaining the memory map of a storage medium which stores various data processing programs capable of being read by the print system according to the present invention.

FIG. 11 is the diagram for explaining the memory map of the storage medium which stores the various data processing programs capable of being read by the print system according to the present invention.

Incidentally, although it is not illustrated specifically, also information (e.g., version information, creator information, etc.) for managing the program groups stored in the storage medium may occasionally be stored in the storage medium, and information (e.g., icon information for discriminatively displaying a program, etc.) depending on an OS or the like on the program reading side may occasionally be stored in the storage medium.

Moreover, the data depending on the various programs are managed on the directory of the storage medium. Besides, a program to install various programs into a computer, a program to uncompress installed programs and data when the installed programs and data have been compressed, and the like are occasionally stored.

Furthermore, the functions shown in FIGS. 4 to 6, 9 and 10 may be executed by a host computer based on externally installed programs. In that case, the present invention is applicable even in a case where an information group including programs is supplied from a storage medium (such as a CD-ROM, a flash memory, an FD or the like) or an external storage medium through a network to an output apparatus.

Incidentally, it is needless to say that the object of the present invention can be achieved-in a case where the storage medium storing the program codes of software to realize the functions of the above embodiments is supplied to a system or an apparatus and then a computer (or CPU or MPU) in the system or the apparatus reads and executes the program codes stored in the storage medium.

In that case, the program codes themselves read from the storage medium realize the novel functions of the present invention, whereby the storage medium storing these program codes constitutes the present invention.

Therefore, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, a magnetooptical disk, a CR-ROM, a CD-R, a CD-RW, a magnetic tape, a nonvolatile memory card, a ROM, a DVD or the like can be used.

In that case, the program codes themselves read out of the storage medium realize the functions of the above embodiments, whereby the storage medium storing these program codes constitutes the present invention.

Besides, as a method of supplying programs, there is a method of connecting with a web site on the Internet by using a browser of the client's computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different web sites. That is, a WWW server, an FTP (file transfer protocol) server and the like for downloading the program files for achieving the function processes of the present invention with use of the computer to plural operators are included in the scope of the present invention.

Moreover, it is possible to encrypt the program of the present invention, store the encrypted program in a storage medium such as a CD-ROM or the like, distribute the obtained storage media to users, cause the user who has satisfied a predetermined condition to download key information for decrypting the encrypted program from the web site through the Internet, cause the user in question to install the decrypted program into an appropriate computer, and thus achieve the functions of the present invention.

Moreover, it is needless to say that the present invention includes not only a case where the functions of the above embodiments are realized by executing the program codes read by the computer, but also a case where an OS (operating system) or the like functioning on the computer executes a part or all of the actual process according to instructions of the program codes, whereby the functions of the above embodiments are achieved by that process.

Furthermore, it is needless to say that the functions of the above embodiments can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

The present invention is not limited to the above embodiments, but the present invention is intended to cover various modifications and equivalent arrangements (including the organic combination of respective embodiments) included within the spirit and scope of the appended claims.

Although the embodiment has been explained by way of various examples, it is apparent for one of ordinary skill in the art that the purpose and the scope of the present invention are not limited to the specific explanations described in the present application.

Incidentally, the present invention is not limited to the above embodiments. That is, various modifications are of course possible within the range not departing from the scope of the present invention.

As many apparently widely different embodiments of the present invention can be made without departing from the spirit and scope thereof, it is to be understood that the present invention is not limited to the specific embodiments thereof expect as defined in the appended claims.

This application claims priority from Japanese Patent Application No. 2004-070401 filed on Mar. 12, 2004, which is hereby incorporated by reference herein.

What is claimed is:

1. A print apparatus comprising:
a memory unit constructed with a capacity to store compressed print information of at least two or more pages transmitted from a host computer;
a decompression unit constructed to decompress the compressed print information read from said memory unit and to output the decompressed print information;
an output unit constructed to output the decompressed print information output from said decompression unit to an image formation unit connected to the output unit according to a horizontal sync signal, wherein said image formation unit performs image formation based on the print information output from said output unit; and
a detection unit constructed to detect, while said image formation unit is performing the image formation for a current page based on the print information output by said output unit, whether a paper size of a paper fed for the image formation of the current page is smaller than a size of an image of the current page; and
a control unit constructed to control, in a case where said detection unit detects that the paper size of the paper fed for the image formation of the current page is smaller than the size of the image of the current page, said decompression unit to abandon the remaining compressed print information for the current page that has not been decompressed by said decompression unit, by causing said decompression unit to read and decompress the remaining compressed print information without outputting the decompressed print information to the output unit,
wherein the remaining compressed print information is decompressed and abandoned by the decompression unit without regard to the horizontal sync signal.

2. A print apparatus according to claim 1, further comprising an indication unit constructed to indicate a read address of the compressed print information to be read from said memory unit, wherein, after said decompressing unit decompresses the compressed print information, said control unit executes the control so as to abandon the compressed print information, for the current page to which said image formation unit is executing the image formation, which is stored in the area subsequent to the read address indicated by said indication unit on said memory unit at the point of time when said detection unit detects that the paper size of the paper for the image formation is smaller than the size of the image of the current page.

3. A print apparatus according to claim 2, wherein the compressed print information includes end code information indicating an end of page, and said control unit controls said decompression unit to execute the abandonment of the compressed print information until said decompression unit decompresses the end code information.

4. A print apparatus according to claim 1, wherein the abandonment of the compressed print information by said decompression unit includes not to output the compressed print information to said output unit.

5. A print apparatus according to claim 1, wherein said detection unit detects that a length in a paper transportation direction of the paper size of the paper fed for the image formation is shorter than the size of the image of the current page to which said image formation unit is executing the image formation.

6. A print apparatus according to claim 1, further comprising:

an indication unit constructed to indicate a read address of the compressed print information to be read from said memory unit; and a page head address management unit constructed to manage an address of data corresponding to the head of the current page in the compressed print information stored by said memory unit, wherein said control unit determines a data amount to be abandoned, based on the read address indicated by said indication unit on said memory unit at the point of time when said detection unit detects that the paper size of the paper for the image formation is smaller than the size of the image of the current page, and a head address, managed by said head address management unit, of the compressed print information of a page subsequent to the current page on which the image formation is performed.

7. A print control method comprising the steps of:

storing compressed print information transmitted from a host computer in a memory unit having a capacity to store the compressed print information of at least two or more pages;

decompressing the compressed print information read from the memory unit and outputting the decompressed print information;

outputting the decompressed print information to an image formation unit according to a horizontal sync signal, wherein said image formation unit performs image formation based on the output decompressed print information; and detecting, while said image formation unit is performing the image formation for a current page based on the output decompressed print information, whether a paper size of a paper fed for the image formation of the current page is smaller than a size of an image of the current page; and controlling, in a case where it is detected that the paper size of the paper fed for the image formation of the current page is smaller than the size of the image of the current page, to abandon the remaining compressed print information for the current page that has not been decompressed, by reading and decompressing the remaining compressed print information without outputting the decompressed print information, wherein the remaining compressed print information is decompressed and abandoned without regard to the horizontal sync signal.

8. A computer-readable storage medium which stores a computer-executable program for causing a computer to execute a print control method, said computer-executable program comprising:

a memory module for storing compressed print information transmitted from a host computer in a memory unit having a capacity to store the compressed print information of at least two or more pages;

a decompression module for decompressing the compressed print information read from the memory unit and outputting the decompressed print information;

an output module for outputting the decompressed print information output from said decompression module to an image formation unit connected to the output module according to a horizontal sync signal, wherein said image formation unit performs image formation based on the print information output from said output module; and a detection module for detecting, while said image formation unit is performing the image formation for a current page based on the print information output by said output module, whether a paper size of a paper fed for the image formation of the current page is smaller than a size of an image of the current page; and a control module for controlling, in a case where said detection module detects that the paper size of the paper fed for the image formation of the current page is smaller than the size of the image of the current page, said decompression module to abandon the remaining compressed print information for the current page that has not been decompressed by said decompression module, by causing said decompression module to read and decompress the remaining compressed print information without outputting the decompressed print information to the output module, wherein the remaining compressed print information is decompressed and abandoned by the decompression module without regard to the horizontal sync signal.

* * * * *